US012676575B2

(12) United States Patent
    Zhou et al.

(10) Patent No.: US 12,676,575 B2
(45) Date of Patent: Jul. 7, 2026

(54) PHOTOVOLTAIC SOLAR ASSEMBLY AND SWITCHING METHOD THEREFOR

(71) Applicant: ALTENERGY POWER SYSTEM INC., Jiaxing (CN)

(72) Inventors: Dongming Zhou, Jiaxing (CN); Yuhao Luo, Jiaxing (CN)

(73) Assignee: ALTENERGY POWER SYSTEM INC., Jiaxing (CN)

( * ) Notice: Subject to any disclaimer, the term of this patent is extended or adjusted under 35 U.S.C. 154(b) by 117 days.

(21) Appl. No.: 18/711,630

(22) PCT Filed: Apr. 29, 2022

(86) PCT No.: PCT/CN2022/090286
    § 371 (c)(1),
    (2) Date: May 20, 2024

(87) PCT Pub. No.: WO2023/165010
    PCT Pub. Date: Sep. 7, 2023

(65) Prior Publication Data
    US 2025/0015755 A1      Jan. 9, 2025

(30) Foreign Application Priority Data
    Mar. 3, 2022    (CN) .......................... 202210208924.5

(51) Int. Cl.
    *H02S 40/34*          (2014.01)
(52) U.S. Cl.
    CPC ................................... *H02S 40/34* (2014.12)

(58) Field of Classification Search
    None
    See application file for complete search history.

(56) References Cited

FOREIGN PATENT DOCUMENTS

| CN | 105720912 A | 6/2016 |
| CN | 106817075 A | 6/2017 |
| CN | 109617523 A | 4/2019 |
| CN | 109672404 A | 4/2019 |
| CN | 110729964 A | 1/2020 |

(Continued)

OTHER PUBLICATIONS

English language machine translation of CN 106814075 A. (Year: 2025).*

(Continued)

*Primary Examiner* — Eli S Mekhlin
(74) *Attorney, Agent, or Firm* — Yue (Robert) Xu; Apex Attorneys at Law, LLP

(57) ABSTRACT

A photovoltaic solar assembly and a switching method therefor. The photovoltaic solar assembly includes an execution junction box, a single master control junction box, and a plurality of solar cell strings that are connected in series; the execution junction box includes a corresponding bypass diode; the master control junction box includes a corresponding bypass diode and a control assembly, and the control assembly is merely arranged in the master control junction box; the solar cell strings are connected in series with each other by means of the corresponding bypass diode of the execution junction box or the corresponding bypass diode of the master control junction box; and the control assembly is used for controlling connection and disconnection between the solar cell strings and a main power circuit.

13 Claims, 19 Drawing Sheets

(56)            References Cited

FOREIGN PATENT DOCUMENTS

| CN | 113364414 | A | 9/2021 |
| CN | 113489052 | A | 10/2021 |
| CN | 217216490 | U | 8/2022 |

OTHER PUBLICATIONS

English language machine translation of CN 109617523 A. (Year: 2025).*
English language machine translation of CN 109672404 A. (Year: 2025).*
Chinese First Office Action issued on Feb. 24, 2025 for the Chinese priority application No. 202210208924.5.
International Search Report for PCT/CN2022/090286 mailed Jun. 17, 2022, ISA/CN.

* cited by examiner

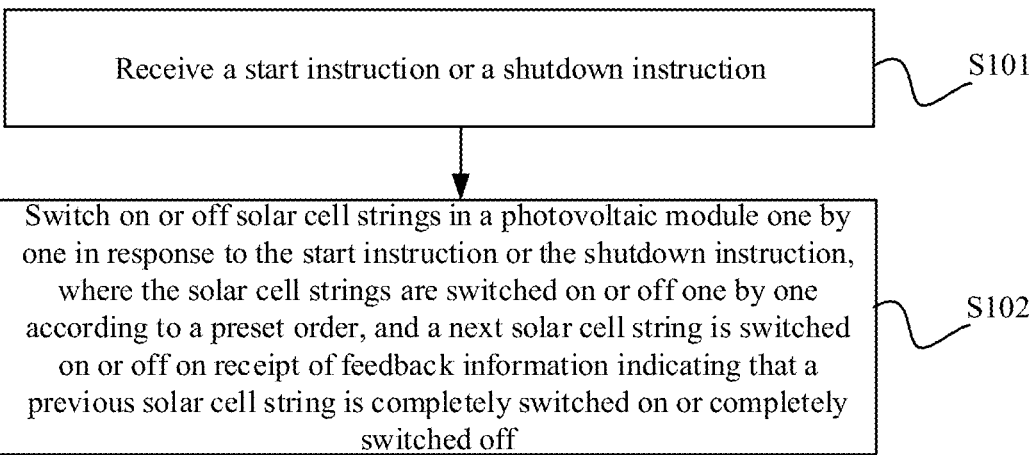

Receive a start instruction or a shutdown instruction — S101

Switch on or off solar cell strings in a photovoltaic module one by one in response to the start instruction or the shutdown instruction, where the solar cell strings are switched on or off one by one according to a preset order, and a next solar cell string is switched on or off on receipt of feedback information indicating that a previous solar cell string is completely switched on or completely switched off — S102

Figure 19

PHOTOVOLTAIC SOLAR ASSEMBLY AND SWITCHING METHOD THEREFOR

The present application is a national phase application of PCT international patent application PCT/CN2022/090286, filed on Apr. 29, 2022 which claims priority to Chinese Patent Application No. 202210208924.5, titled "PHOTO-VOLTAIC SOLAR ASSEMBLY AND SWITCHING METHOD THEREFOR", filed on Mar. 3, 2022 with the China National Intellectual Property Administration, both of which are incorporated herein by reference in their entireties.

FIELD

The present disclosure relates to the field of photovoltaic power generation, and in particular to a photovoltaic module and a method for switching the photovoltaic module.

BACKGROUND

Since solar energy is renewable and clean, photovoltaic grid-connected power generation technology has developed rapidly. Generally, in a photovoltaic system, multiple photovoltaic modules are connected in series to form a string, and the string is connected to an inverter to convert direct current into alternating current and output the alternating current to a power grid. In the early days, each photovoltaic module is provided with one junction box, and internally provided with bypass diodes, and each of all the bypass diodes are connected in parallel with one solar cell string, as shown in FIG. 1.

In recent years, split junction boxes have been provided. Compared with the conventional junction box shown in FIG. 1, split junction boxes shown in FIG. 2 less covers solar cells located below the split junction box, greatly increasing a light-receiving area of the solar cells, reducing the resistance loss, and reducing the consumption of cables. In the conventional technology, a controller is arranged in each of the junction boxes and an instruction is separately transmitted to the controller, to control a solar cell string corresponding to the junction box to be connected to or disconnected from a main power circuit through the junction box, in order to provide the junction box with a shutdown function. However, with the solution in the conventional technology, a volume of the junction box is increased, a shielding area of solar energy is increased, reducing an effective light-receiving area of the photovoltaic module, resulting in a decrease in the photoelectric conversion efficiency.

Therefore, how to achieve a junction box with a shutdown function and a small volume, to reduce shielding of the junction box to the photovoltaic module and improve the photoelectric conversion efficiency is a problem to be solved urgently in the conventional technology.

SUMMARY

An objective of the present disclosure is to provide a photovoltaic module and an method for switching the photovoltaic module, to solve the problem that the photovoltaic module is blocked due to an excessive projection area of the junction box in the conventional technology.

To solve the above technical problem, a photovoltaic module is provided according to the present disclosure. The photovoltaic module includes an execution junction box, one master junction box, and multiple solar cell strings that are connected in series. The execution junction box incudes a bypass diode. The master junction box incudes a bypass diode and a control module, and the control module is arranged only in the master junction box. One of the multiple solar cell strings is connected to another in series through the bypass diode in the execution junction box or the bypass diode in the master junction box. The control module is configured to control the multiple solar cell strings to be connected to or disconnected from a main power circuit.

In an embodiment, in the photovoltaic module, the master junction box includes a sub switching device, and the execution junction box includes a sub switching device. The control module is signally connected to the sub switching devices, and is configured to switch on or off the sub switching devices to control the solar cell string corresponding to the sub switching device to be connected to or disconnected from the main power circuit.

In an embodiment, in the photovoltaic module, two power terminals of the control module are connected to a head end and a tail end of the photovoltaic module, respectively.

In an embodiment, in the photovoltaic module, two power terminals of the control module are connected to two terminals of one of the multiple solar cell strings, respectively.

In an embodiment, in the photovoltaic module, the master junction box further includes a main switching device, and the photovoltaic module is connected in series with the main power circuit through the main switching device.

In an embodiment, in the photovoltaic module, two power terminals of the control module are connected to a positive terminal of one of the multiple solar cell strings and a negative terminal of one of the multiple solar cell strings in the photovoltaic module, respectively.

In an embodiment, in the photovoltaic module, in a case that the photovoltaic module includes a main switching device, the main switching device is implemented by an MOS transistor; and in a case that the photovoltaic module includes the sub switching devices, each of the sub switching devices is implemented by an MOS transistor.

In an embodiment, in the photovoltaic module, the control module includes a sampling circuit, and the sampling circuit is configured to sample electrical signal data at a preset position of the main power circuit or the photovoltaic module.

A method for switching a photovoltaic module is provided, and is applied to the photovoltaic module described above. The method includes: receiving a start instruction or a shutdown instruction; and switching on or off the solar cell strings in the photovoltaic module one by one in response to the start instruction or the shutdown instruction, where the solar cell strings are switched on or off one by one according to a preset order, and a next solar cell string is switched on or off on receipt of feedback information indicating that a previous solar cell string is completely switched on or completely switched off.

In an embodiment, in the method for a photovoltaic module, the switching on or off the solar cell strings in the photovoltaic module one by one in response to the start instruction or the shutdown instruction includes: switching on the solar cell strings in the photovoltaic module one by one in response to the start instruction; or switching off the solar cell strings in the photovoltaic module one by one when the start instruction is not received throughout a first preset time period.

The photovoltaic module according to the present disclosure includes an execution junction box, one master junction box and multiple solar cell strings connected in series. The execution junction box includes a bypass diode. The master junction box includes a bypass diode and a control module.

The control module is arranged only in the master junction box. One of the multiple solar cell strings is connected to another in series through the bypass diode in the execution junction box or the bypass diode in the master junction box. The control module is configured to control the multiple solar cell strings to be connected to or disconnected from a main power circuit. In the present disclosure, the control module is integrated into one junction box (i.e., the master junction box) instead of arranging a controller in each junction box in the conventional technology, only the master junction box has a large volume, greatly reducing the volume of the execution junction box. The master junction box is wired independently and arranged in a region without covering the solar cell strings, reducing projection areas of the junction boxes on light-facing surfaces of the solar cells, so as to improve the light-receiving area of the photovoltaic module, thereby improving the photoelectric conversion efficiency of the photovoltaic module. A method for switching a photovoltaic module is further provided according to the present disclosure, and the method also has the above beneficial effects.

BRIEF DESCRIPTION OF THE DRAWINGS

In order to more clearly describe technical solutions in embodiments of the present disclosure or the conventional technology, drawings to be used in the description of the embodiments or the conventional technology are briefly introduced hereinafter. It is apparent that the drawings described below show merely the embodiments of the present disclosure, and those skilled in the art can obtain other drawings based on the provided drawings without any creative effort.

FIG. 19 is a flowchart of a method for switching a photovoltaic module according to an embodiment the present disclosure.

DETAILED DESCRIPTION OF THE EMBODIMENTS

Figure 1:
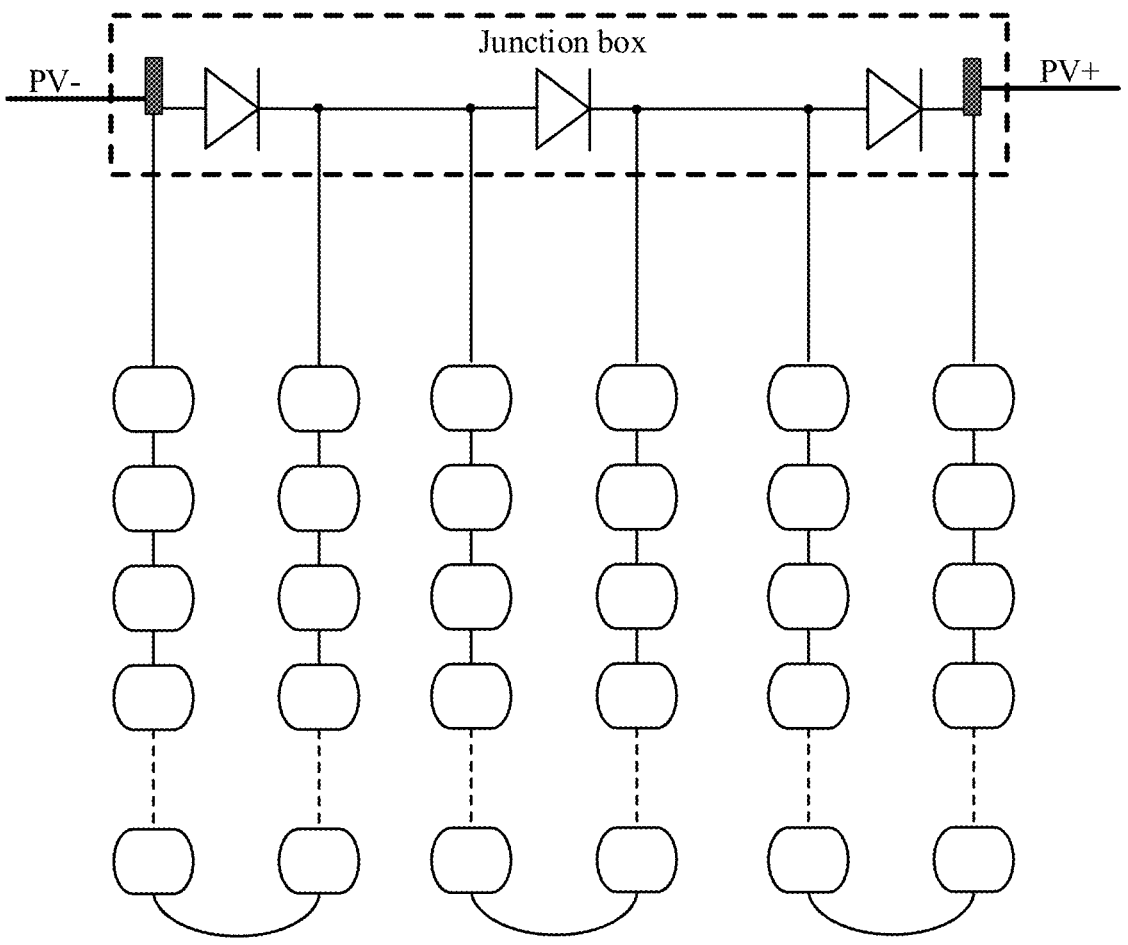
FIG. 1 and FIG. 2 are schematic structural diagrams of photovoltaic modules in the conventional technology.
Figure 2:
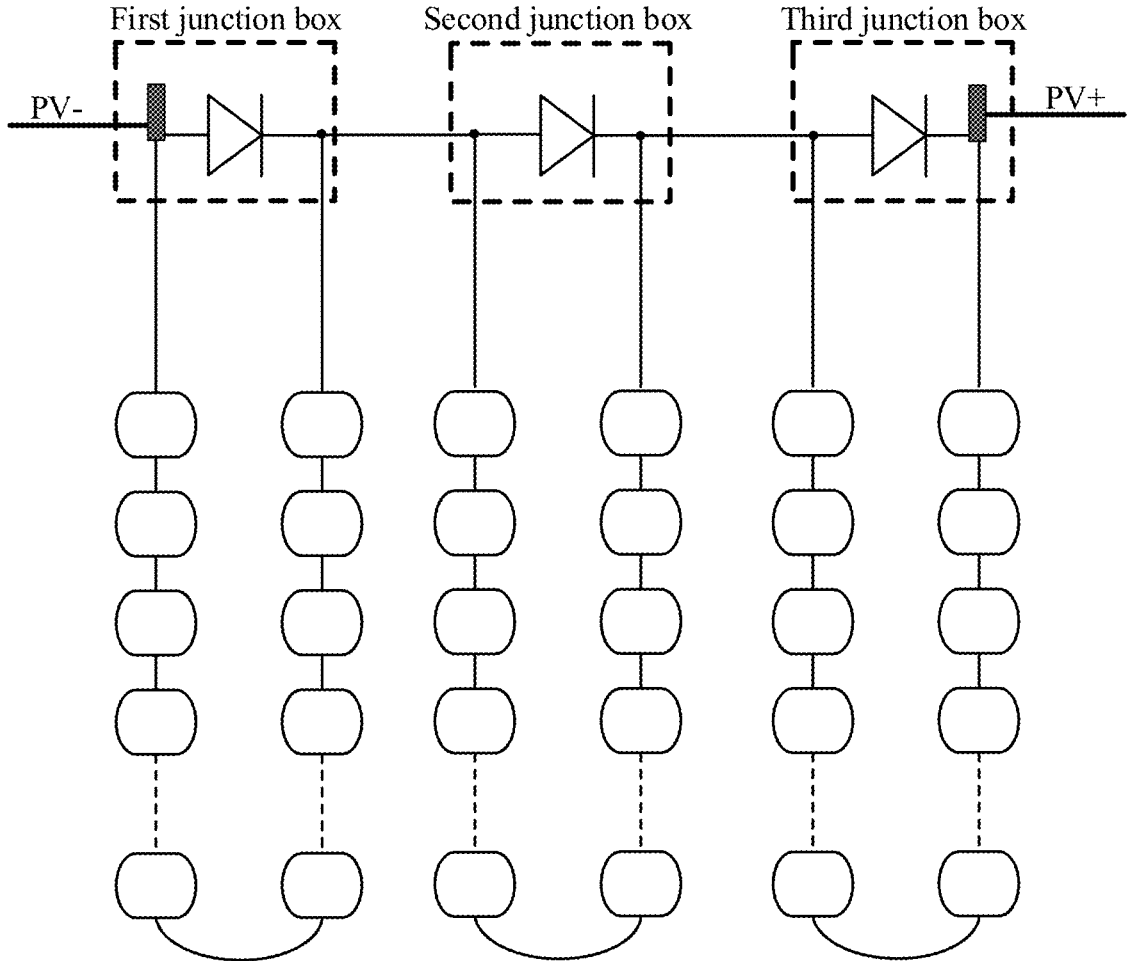

In order to better understand the solutions according to the present disclosure, the present disclosure is described in detail below in conjunction with the drawings and the embodiments. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

A photovoltaic module is provided according to the present disclosure. Schematic diagrams and related descriptions of embodiments of the photovoltaic module are shown below. The photovoltaic module includes an execution junction box 30, one master junction box 20 and multiple solar cell strings 10 connected in series.

The execution junction box 30 includes a bypass diode. The master junction box 20 includes a bypass diode and a control module 40, and the control module 40 is arranged only in the master junction box 20.

One of the multiple solar cell strings 10 is connected to another in series through the bypass diode in the execution junction box 30 or the bypass diode in the master junction box 20.

The control module 40 is configured to control the solar cell strings 10 to be connected to or disconnected from a main power circuit.

The master junction box 20 includes a sub switching device 50, and the execution junction box 30 includes a sub switching device 50.

The control module 40 is signally connected to the sub switching devices 50, and is configured to switch on or off the sub switching devices 50 to control the solar cell string 10 corresponding to the sub switching device 50 to be connected to or disconnected from the main power circuit.

In an embodiment, each of the junction boxes includes one sub switching device 50. The sub switching device 50 independently disconnects the corresponding solar cell string 10 from the main power circuit under control of the control module 40, greatly improving the flexibility of the photovoltaic module. In addition, when a single solar cell string 10 fails, the failed solar cell string may be independently disconnected from the main power circuit, so as to reduce the interference of the failure on the entire photovoltaic module, thereby improving the stability of the photovoltaic module.

Figure 3:
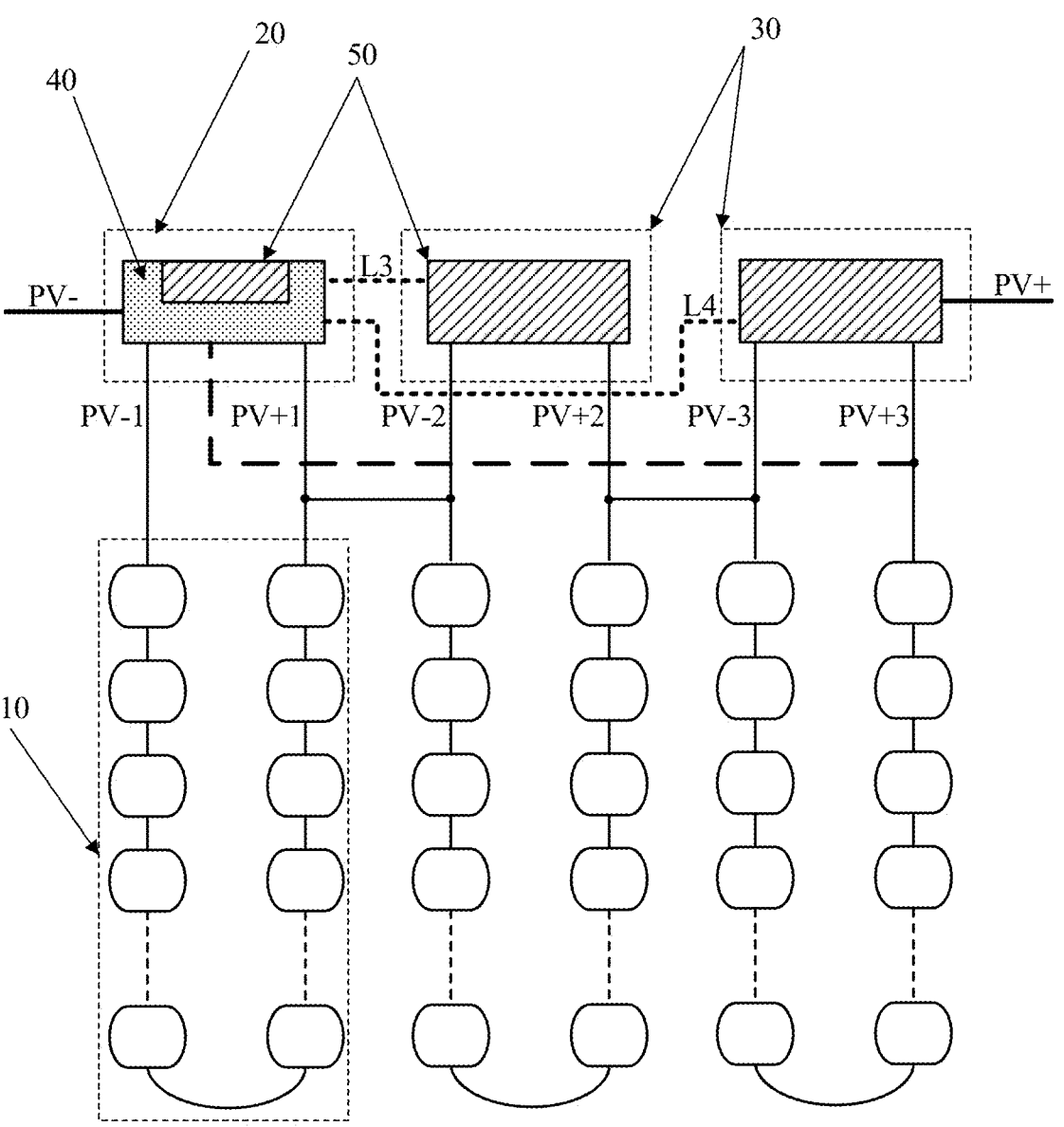
FIG. 3 to FIG. 10 are schematic structural diagrams of photovoltaic modules according to a first type of embodiments of the present disclosure.
Figure 4:
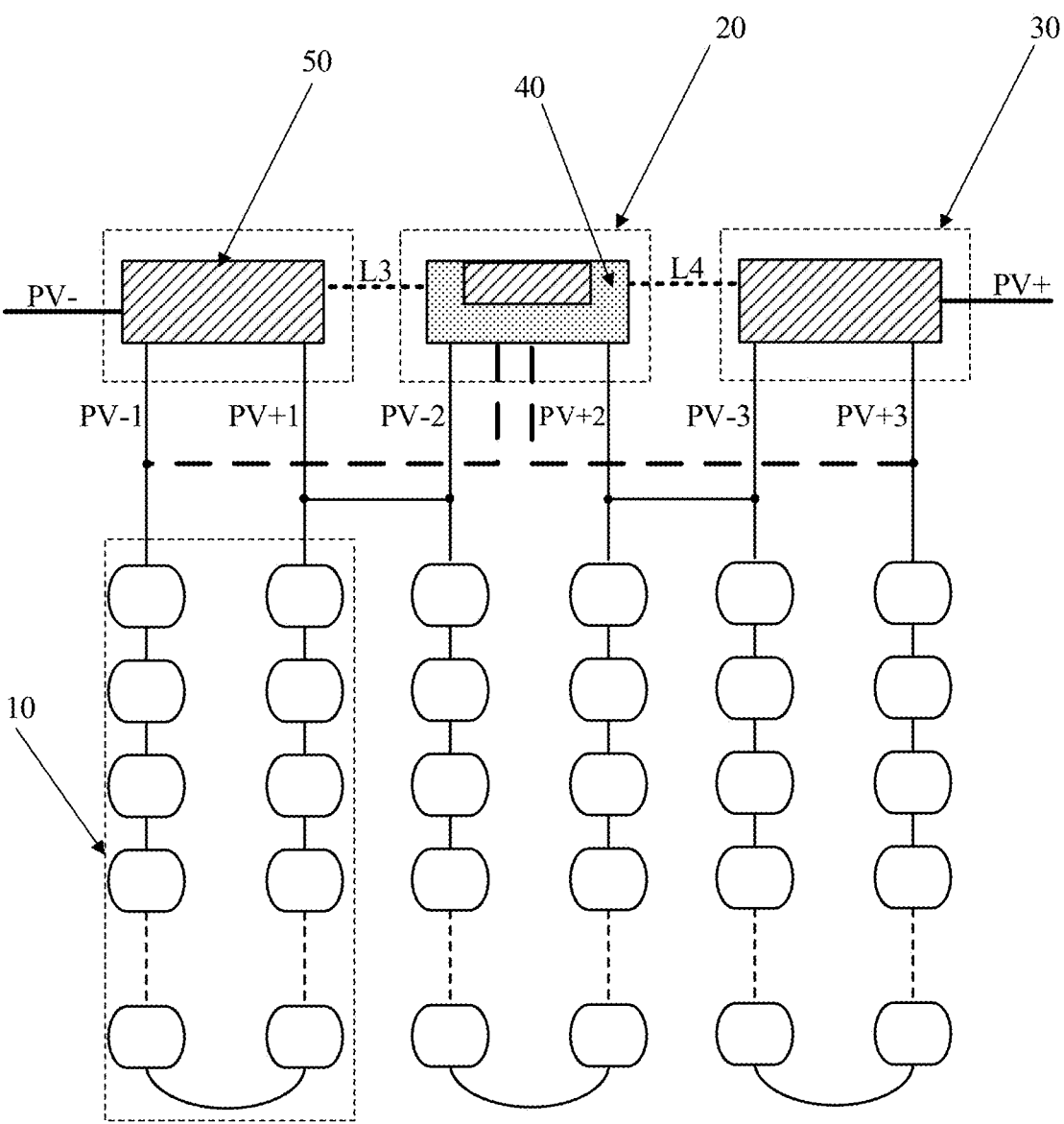

In a preferred embodiment, FIG. 3 and FIG. 4 are schematic structural diagrams of photovoltaic modules, in which two power terminals of the control module 40 are connected to a head end and a tail end of the photovoltaic module, respectively. FIG. 3 shows a case where the master junction box 20 corresponding to a solar cell string at a side of the multiple solar cell strings. FIG. 4 shows a case where the master junction box 20 corresponding to the middle one of the solar cell strings. Although the photovoltaic module in the Figures includes three solar cell strings 10, the number of the solar cell strings 10 in practice depends on actual needs, and the connection of the master junction box 20 remains almost unchanged. Two short dashed lines denoted by L3 and L4 in the Figures each indicate a signal connection between the control module 40 and other execution junction boxes 30, which have the same meanings hereinafter. A long dashed line in the Figures indicates a power supply line for the control module 40, that is, connection lines of the power terminals of the control module 40.

As can be seen from FIG. 3 and FIG. 4, the head end and the tail end are an input terminal and an output terminal of a whole formed by the multiple solar cell strings 10 connected in series, respectively. That is, a voltage across the head end and the tail end (i.e., terminals PV+3 and PV−1 in the Figures) is a maximum voltage for the photovoltaic module during operation. The two power terminals of the control module 40 are connected to the head end and the tail end of the photovoltaic module, respectively, which means that the control module 40 is powered by the entire photovoltaic module. In this way, even if one solar cell string 10 in the photovoltaic module fails, remaining solar cell strings 10 can still supply power to the control module 40, greatly improving the operating stability and the fault tolerance rate of the control module 40.

Figure 5:
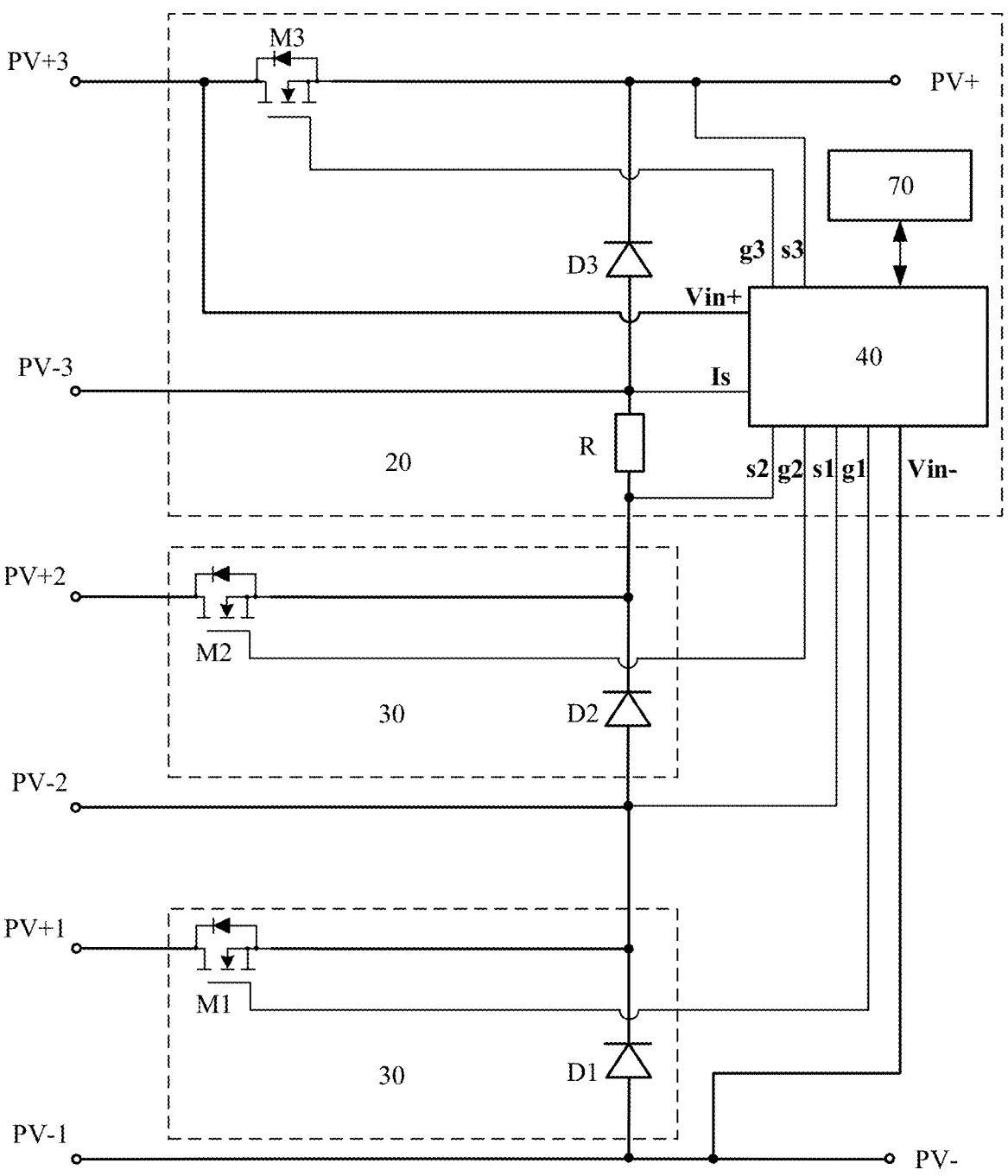

FIG. 5 is a block diagram showing an internal control circuit of the photovoltaic module shown in FIG. 3. It can be seen from FIG. 5 that sub switching devices M1, M2 and M3 are each implemented by an MOS transistor. For the control module 40, terminals g1 and s1 are used to control the MOS transistor M1, terminals g2 and s2 are used to control the MOS transistor M2, terminals g3 and s3 are used to control the MOS transistor M3, and terminals Vin+ and Vin– serve as the two power terminals of the control module 40. Same reference numerals have the same meanings in other Figures, which are not repeated hereinafter. The MOS transistor occupies a small space and is easily controlled to be switched on or off, and thus is suitable as the sub switching device. Description of the sub switching device is applicable to the main switching device hereinafter. In an embodiment, the sub switching device is further implemented by other component as needed. D1, D2 and D3 in FIG. 5 each represent a bypass diode.

Further, the control module 40 includes multiple driving modules corresponding to the MOS transistors.

Figure 10:
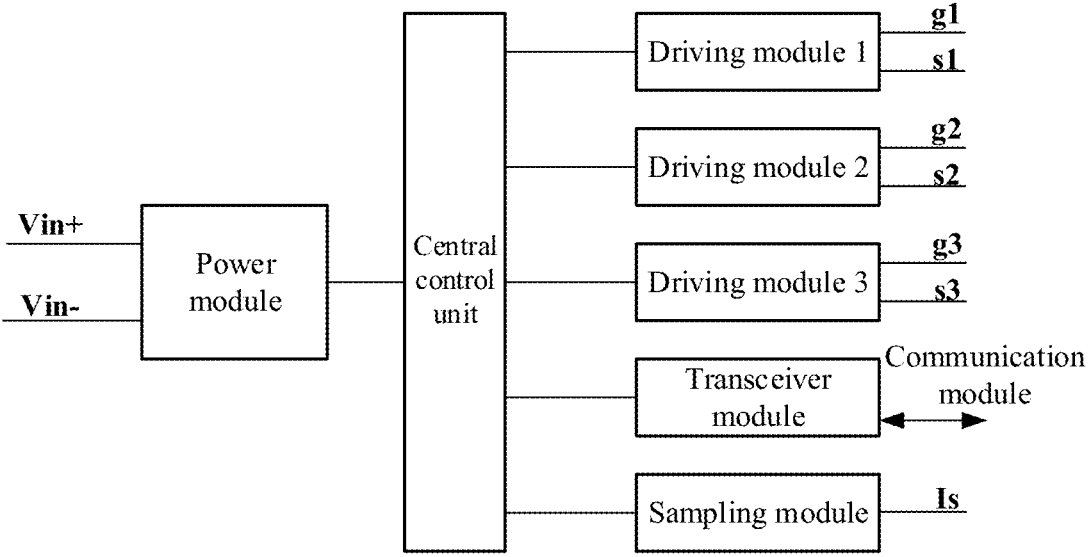

The control module 40 controls the MOS transistors through the driving modules. Referring to FIG. 10, the control module 40 includes a power module, a central control unit and multiple driving modules. In some cases, the control module 40 further includes a sampling module and a transceiver module. The sampling module is connected to a sampling circuit hereinafter. The transceiver module is connected to a communication module 70 and is configured to exchange information with an external network. The power module is connected to an external circuit through the two power terminals (referring to FIG. 5).

Further, the driving module is implemented by an isolated power supply, a charging pump, a buck-boost circuit or in other form that can realize variable-voltage drive and control.

Preferably, the control module 40 includes a sampling circuit.

The sampling circuit is configured to sample electrical signal data at a preset position of the main power circuit or the photovoltaic module. Referring to FIG. 5, a sampling resistor R is arranged for the photovoltaic module, and a current Is flowing through the sampling resistor R is sampled to monitor the photovoltaic module. In addition, the photovoltaic module is monitored in other manners, such as measuring a voltage across the sampling resistor R. The monitoring manner is not limited here.

Figure 6:
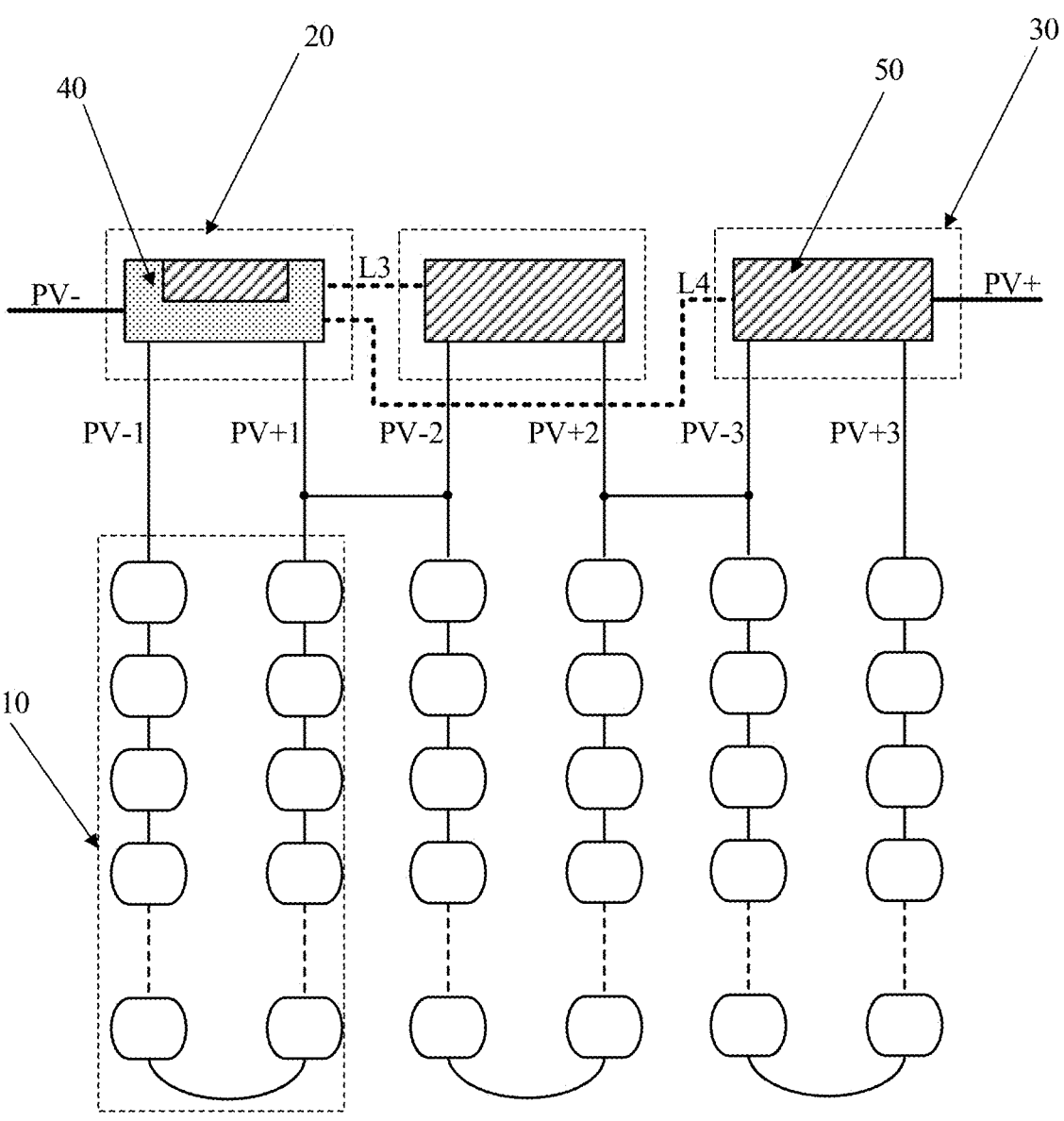
Figure 7:
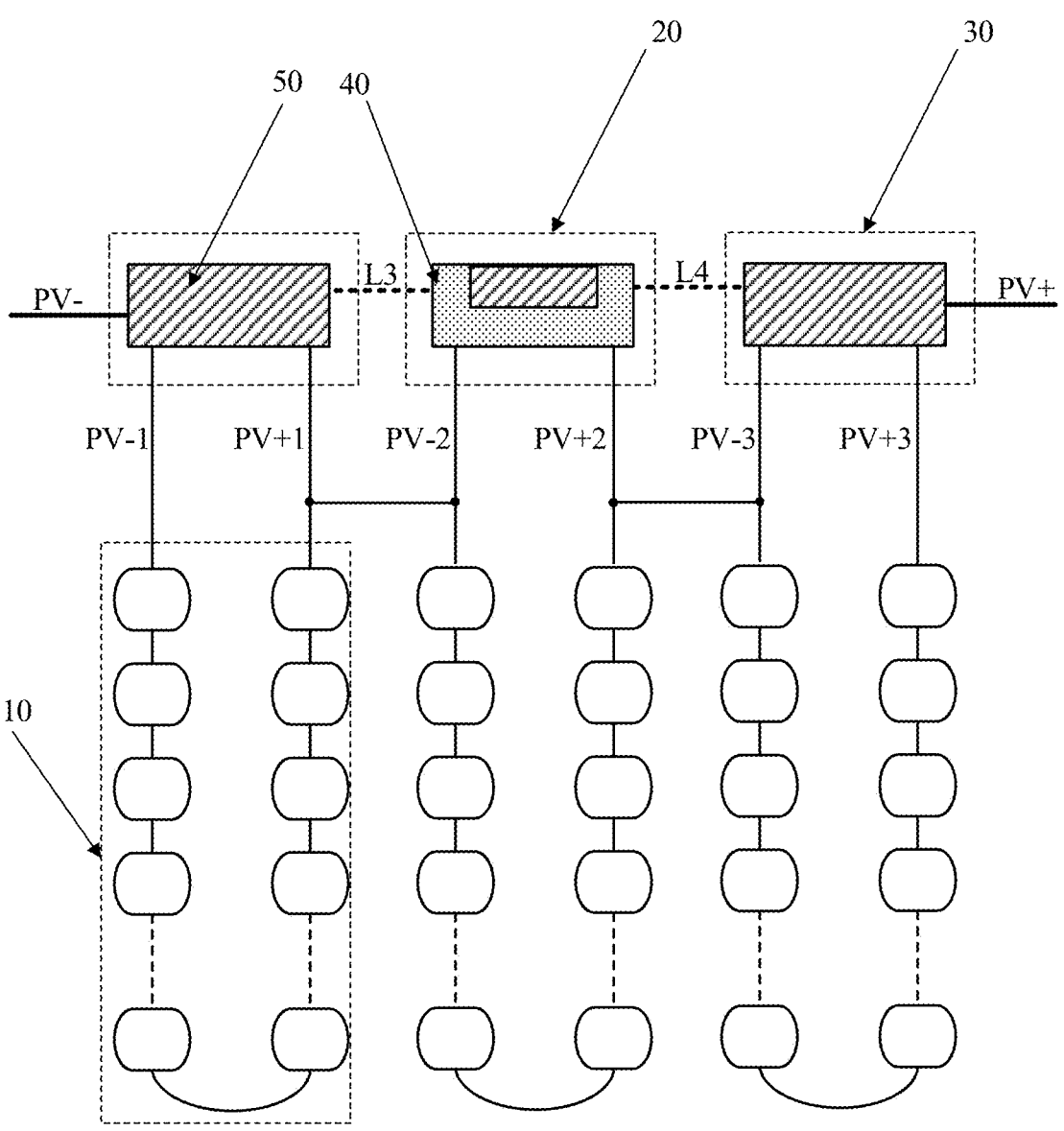
Figure 8:
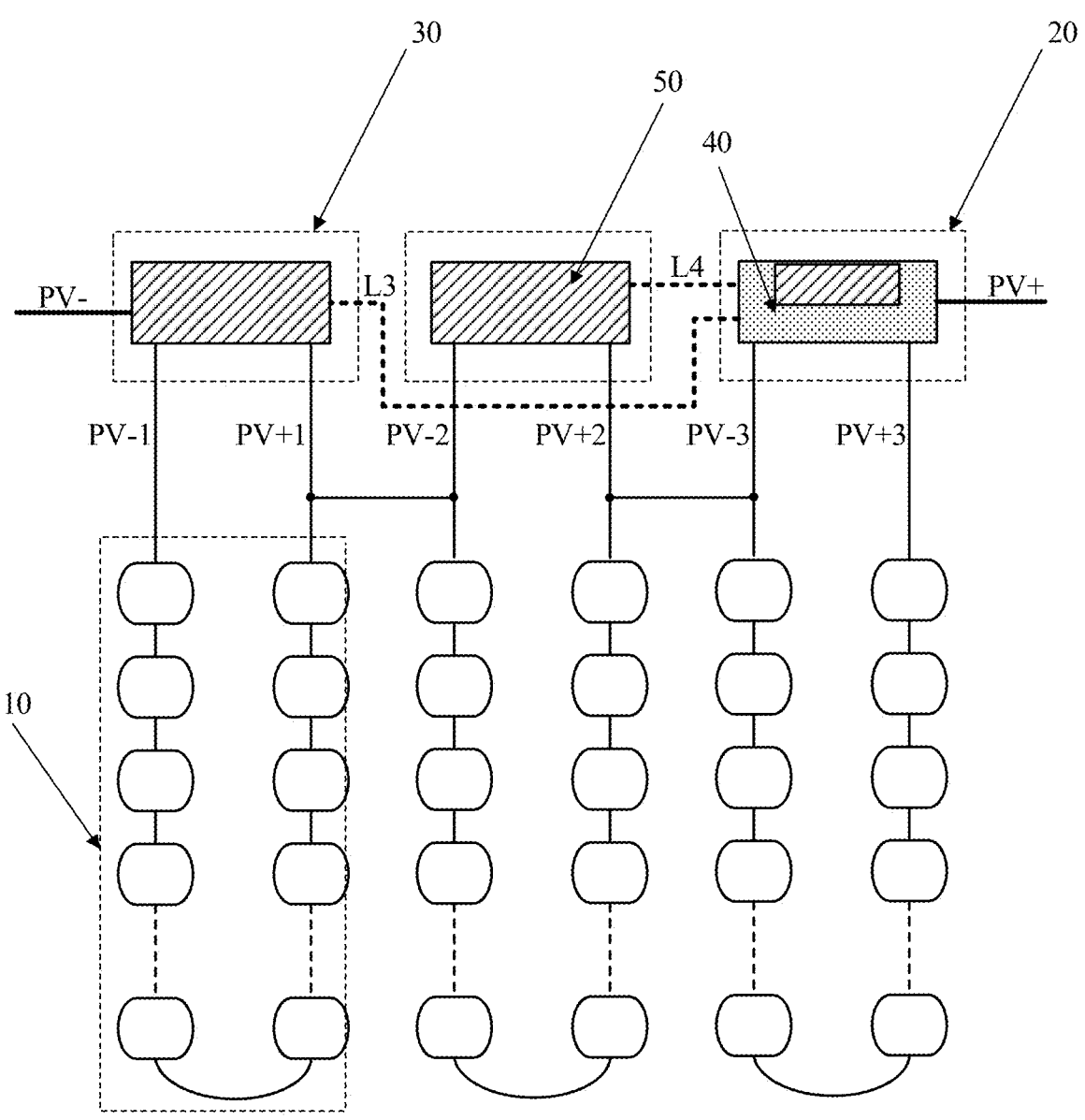
Figure 9:
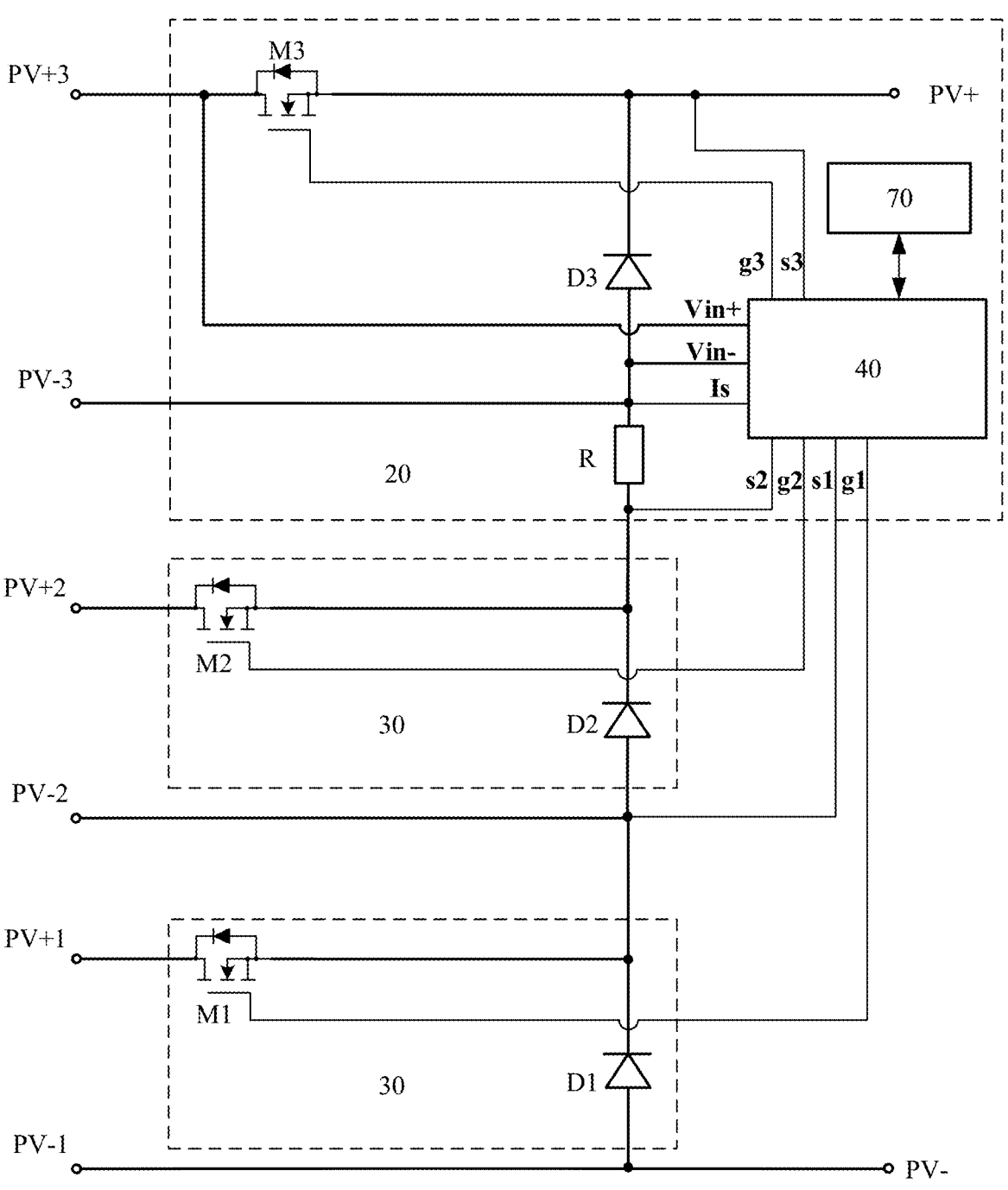

In another preferred embodiment, the two power terminals of the control module 40 are connected to two terminals of one solar cell string 10, respectively. Referring to FIG. 6, FIG. 7 and FIG. 8, FIG. 6 is a schematic diagram shows that the master junction box 20 is a first junction box in the photovoltaic module formed by three solar cell strings 10, FIG. 7 is a schematic diagram shows that the master junction box 20 is a second junction box in the photovoltaic module formed by the three solar cell strings 10, and FIG. 8 is a schematic diagram shows that the master junction box 20 is a third junction box in the photovoltaic module formed by the three solar cell strings 10. FIG. 9 is a schematic diagram showing a partial circuit in FIG. 8. The two terminals of the one solar cell string 10 may be terminals PV–1 and PV+1, PV–2 and PV+2, or PV–3 and PV+3 in the Figures.

In the preferred embodiment, the control module 40 is powered by the single solar cell string 10, greatly simplifying the wirings, improving the production efficiency and the system reliability, and reducing the requirements for the current and voltage of the control module 40, thereby reducing the power of the control module 40.

The photovoltaic module according to the present disclosure includes the execution junction box 30, one master junction box 20 and multiple solar cell strings 10 connected in series. The execution junction box 30 includes a bypass diode. The master junction box 20 includes a bypass diode and the control module 40. The control module 40 is arranged only in the master junction box 20. One of the multiple solar cell strings 10 is connected to another in series through the bypass diode in the execution junction box 30 or the bypass diode in the master junction box 20. The control module 40 is configured to control the solar cell strings 10 to be connected to or disconnected from the main power circuit. In the present disclosure, the control module 40 is integrated into one junction box (i.e., the master junction box 20) instead of arranging a controller in each junction box in the conventional technology, only the master junction box 20 has a large volume, greatly reducing the volume of the execution junction box 30. The master junction box 20 is wired independently and arranged in a region without covering the solar cell strings 10, reducing projection areas of the junction boxes on light-facing surfaces of the solar cells, so as to improve the light-receiving area of the photovoltaic module, thereby improving the photoelectric conversion efficiency of the photovoltaic module.

Based on the above embodiments, in another embodiment, as shown in FIG. 11 to FIG. 18, the photovoltaic module includes an execution junction box 30, one master junction box 20 and multiple solar cell strings 10 connected in series.

The execution junction box 30 includes a bypass diode. The master junction box 20 includes a bypass diode and a control module 40, and the control module 40 is arranged only in the master junction box 20.

One of the multiple solar cell strings 10 is connected to another in series through the bypass diode in the execution junction box 30 or the bypass diode in the master junction box 20.

The control module 40 is configured to control the solar cell strings 10 to be connected to or disconnected from a main power circuit.

The master junction box further includes a main switching device 60.

The photovoltaic module is connected in series with the main power circuit through the main switching device 60.

In other words, the head end and the tail end of the photovoltaic module are connected to two terminals (i.e., terminals PV+ and PV– shown in FIG. 11) of the main power circuit, respectively. In this embodiment, the main switching device 60 directly controls the entire photovoltaic module to be connected to or disconnected from the main power circuit, expanding application scenarios of the photovoltaic module, thereby improving the generality.

In a preferred embodiment, two power terminals of the control module 40 are connected to a positive terminal of one of the solar cell strings 10 and a negative terminal of one of the solar cell strings 10 in the photovoltaic module, respectively. Detail may be referred to different connection manners of the two power terminals of the control module 40 described above.

Figure 11:
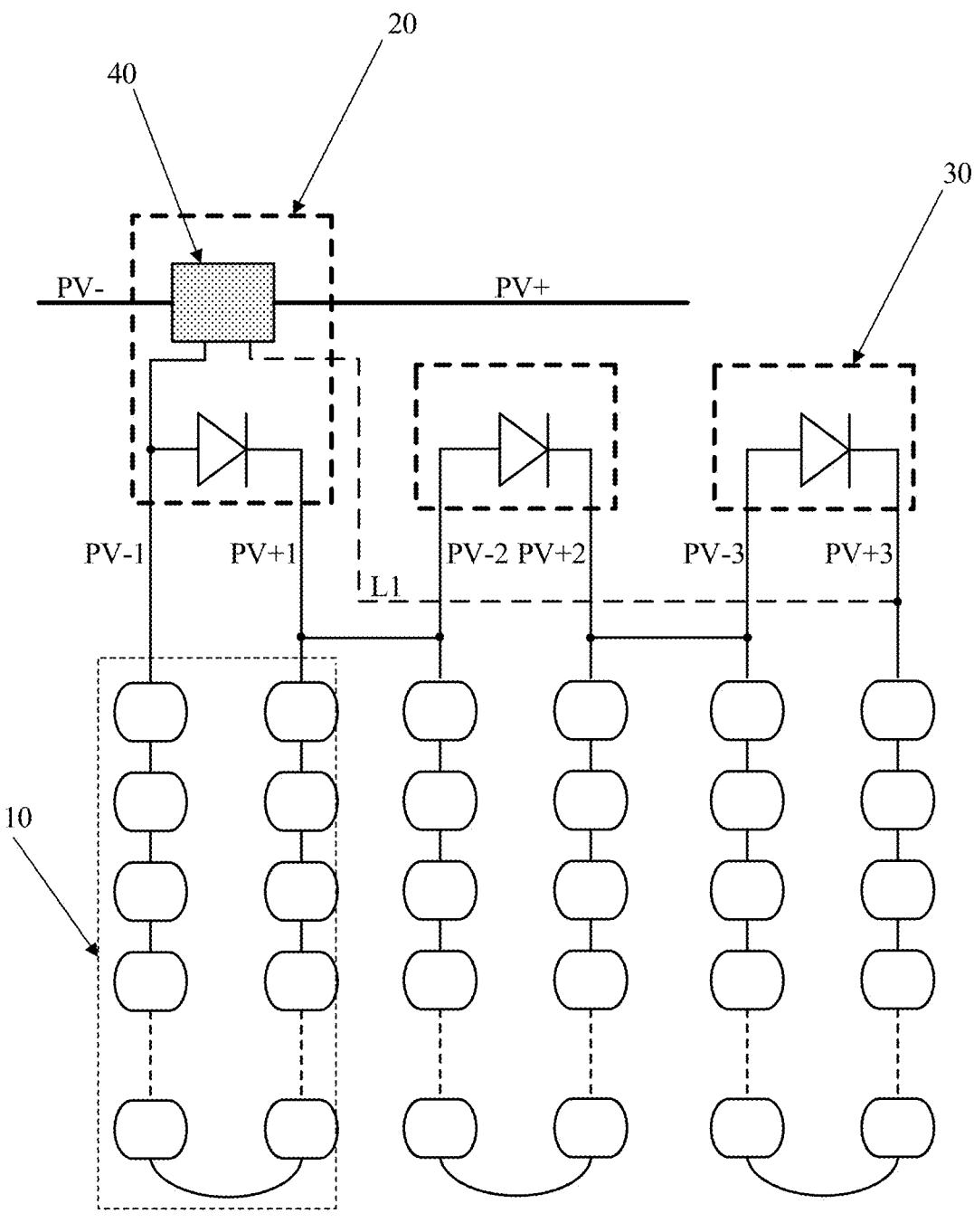
FIG. 11 to FIG. 18 are schematic structural diagrams of photovoltaic modules according to a second type of embodiments of the present disclosure.
Figure 12:
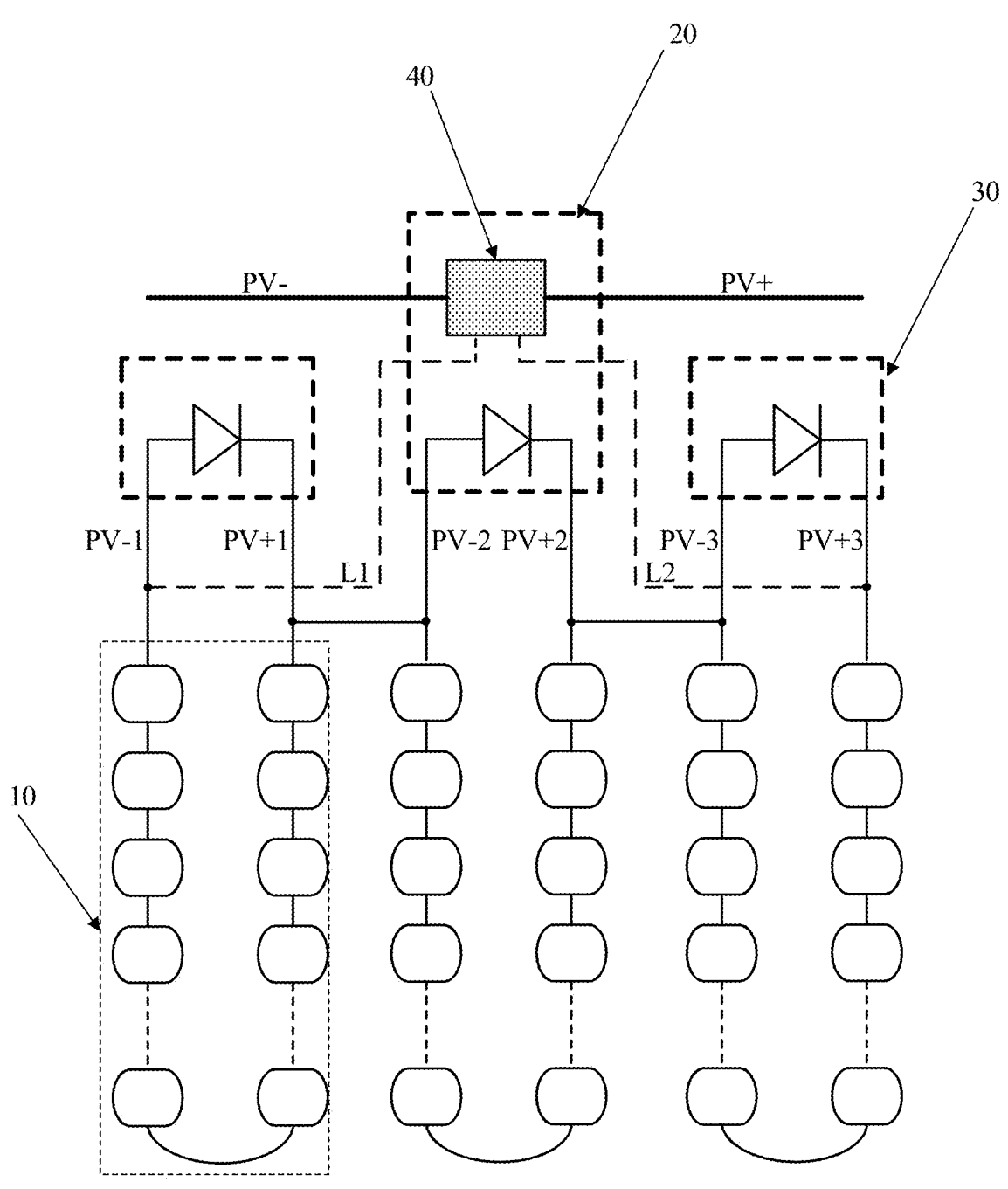
Figure 13:
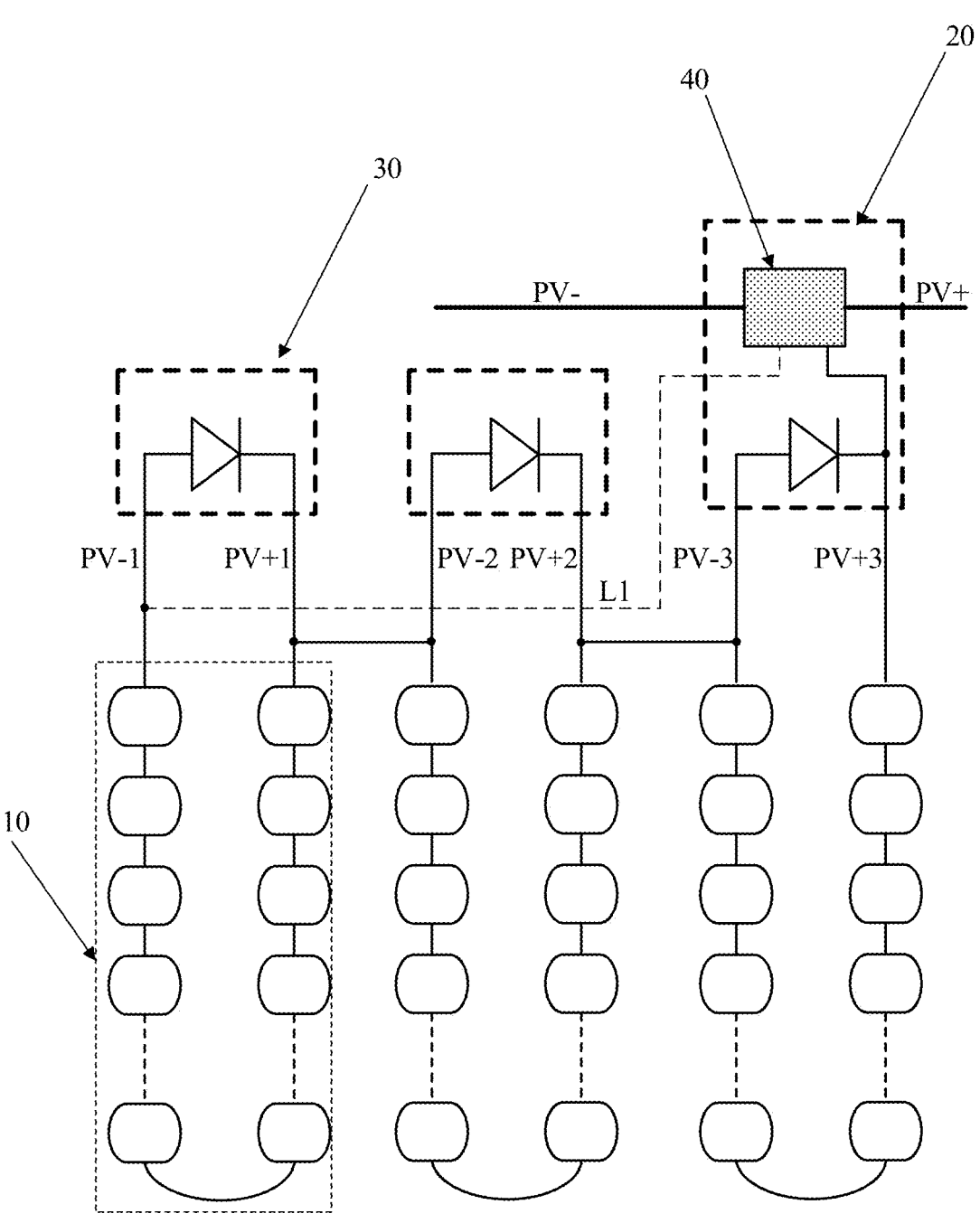

Reference is made to FIG. 11, FIG. 12 and FIG. 13, in which the two power terminals of the control module 40 are connected to the head end and the tail end of the photovoltaic module, respectively, and the control module 40 is powered by the entire photovoltaic module. FIG. 11, FIG. 12 and FIG. 13 are different in that the control module 40 is arranged in different junction boxes. As described above regarding the supplying power to the control module 40, even if one solar cell string 10 in the photovoltaic module fails, remaining solar cell strings 10 can still supply power to the control module 40, greatly improving the operating stability and the fault tolerance rate of the control module 40. L1 and L2 in FIG. 11, FIG. 12 and FIG. 13 represent power supply lines for the control module 40. In addition, each of the junction boxes includes one bypass diode. The bypass diode has the identical function as that in the conventional technology, and therefore is not repeated here.

Figure 14:
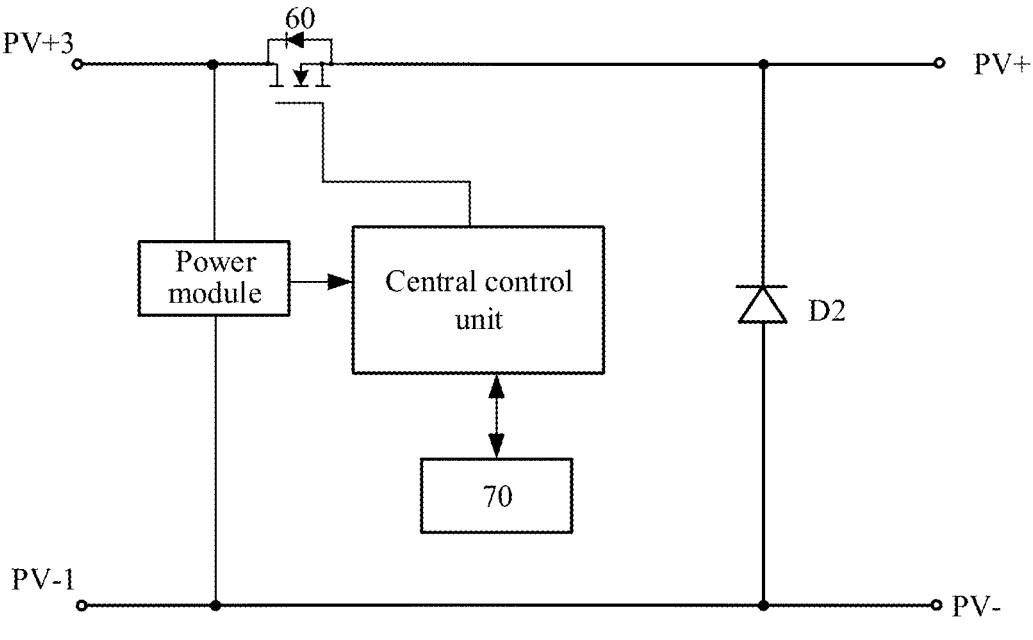
Figure 15:
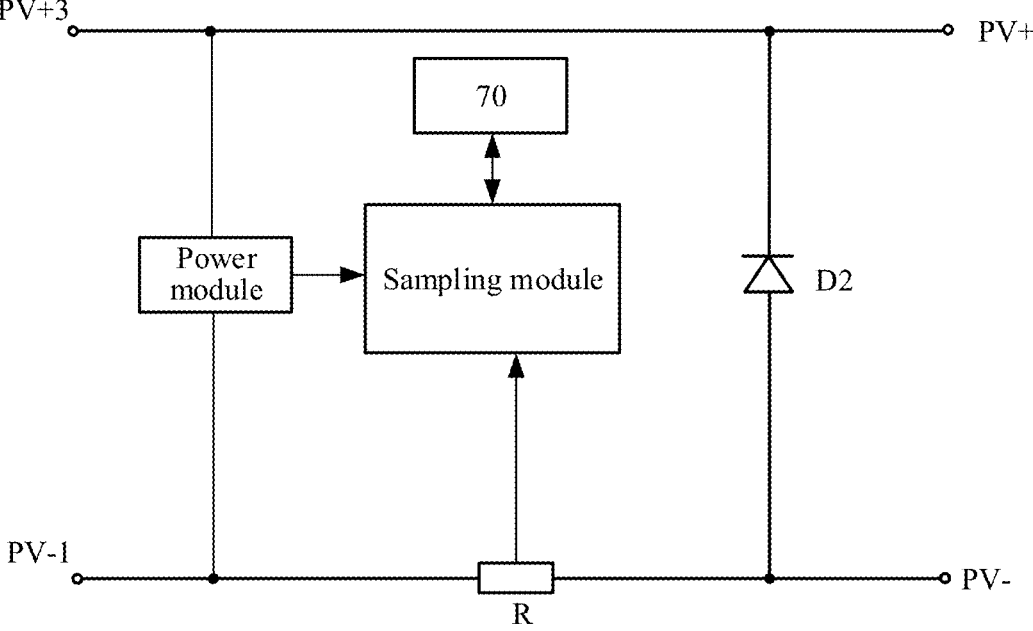

FIG. 14 is a schematic diagram showing connection between the control module 40 and the main power circuit. As shown in FIG. 15, the sampling circuit samples information and transmits the information to the control module 40, and the information is transmitted to an external network via the communication module 70. D2 in FIG. 15 represents a bypass diode. The bypass diode has the identical function as that in the conventional technology, and therefore is not repeated here.

Figure 16:
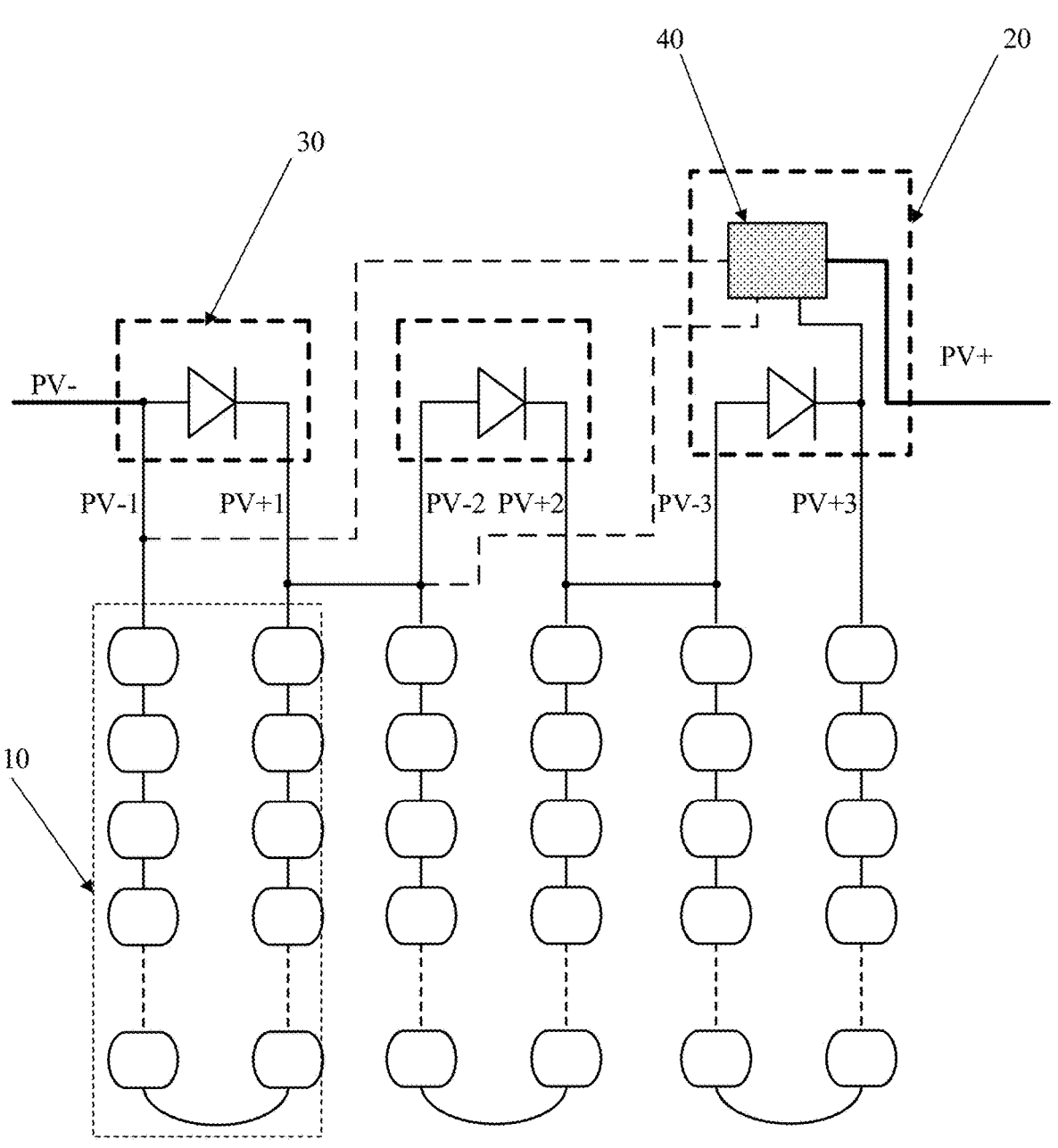
Figure 17:
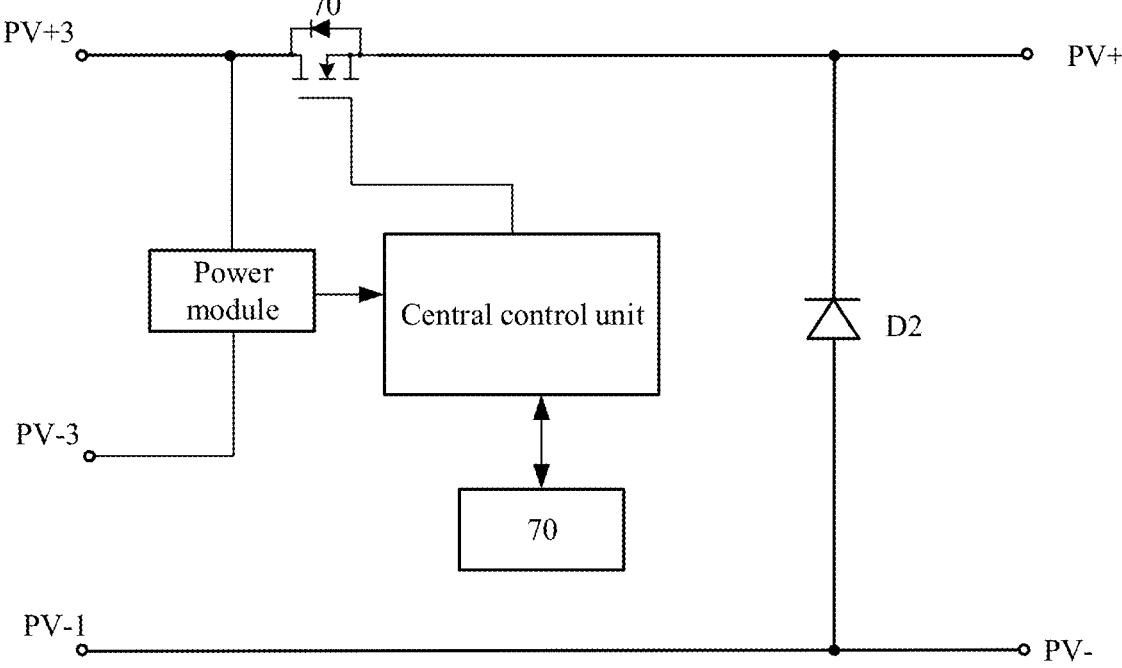
Figure 18:
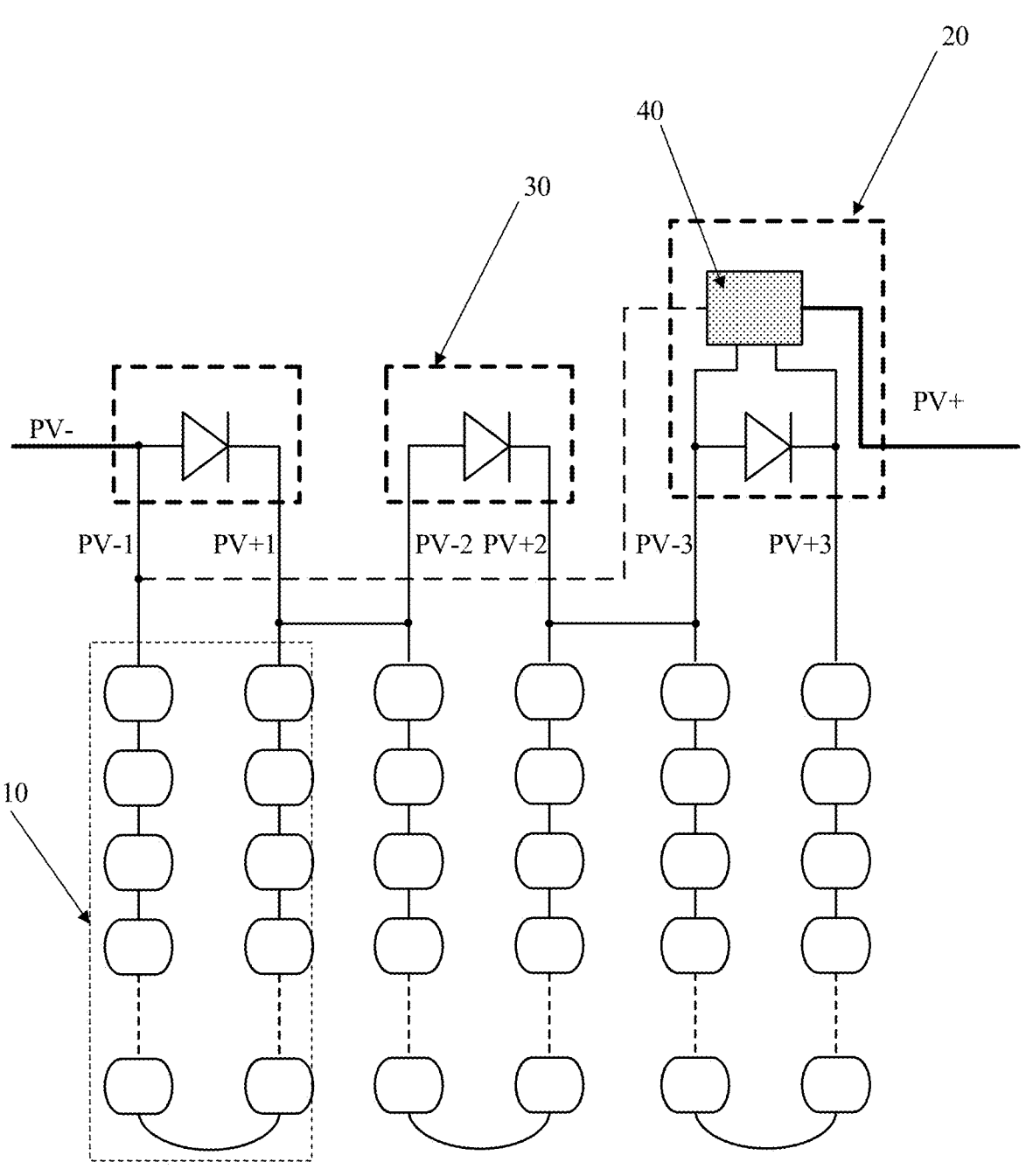

As shown in FIG. 16, the control module 40 is powered by two strings (i.e., two of the solar cell strings 10), and an output cable (PV−) is led out from the outside of the junction box. As shown in FIG. 16, for example, the control module 40 is arranged in the third junction box, in this solution, the control module 40 is powered by terminals PV−2 and PV+3. FIG. 17 is a schematic diagram showing internal shutdown and power supply of the photovoltaic module in this example. Similarly, the control module 40 may be arranged in the first junction box or the second junction box. Similarly, the control module 40 may be powered by one string, for example, the control module 40 may be powered by terminals PV−3 and PV+3 as shown in FIG. 18, which is implemented in a way similar to the way for supplying power to the control module 40 by two strings. In this example, a chip power supply may be designed according to different ways for supplying power by strings. In order to ensure that the control signal is transmitted to the control module 40 through all junction boxes, an RLC circuit may be arranged in the junction boxes to obtain appropriate impedance.

A method for switching a photovoltaic module is further provided according to the present disclosure. FIG. 19 is a flowchart of a method for switching a photovoltaic module according to an embodiment the present disclosure. The method includes the following steps S101 and S102.

In step S101, a start instruction or a shutdown instruction is received.

In step S102, solar cell strings 10 in the photovoltaic module are switched on or off one by one in response to the start instruction or the shutdown instruction, where, the solar cell strings are switched on or off one by one according to a preset order, and a next solar cell string 10 is switched on or off on receipt of feedback information indicating that a previous solar cell string 10 is completely switched on or completely switched off.

With the method according to the present disclosure, the solar cell strings in the photovoltaic module are switched on or off one by one, a peak value of a power supply at a moment when the photovoltaic module is started is reduced. The design cost of the driving modules including transistors, inductors, and capacitors is reduced by progressive start, and a sudden impact caused by driving a device in the photovoltaic module is reduced by progressive shutdown, thereby improving the soft shutdown capacity and the stability of the photovoltaic module.

In a preferred embodiment, the solar cell strings 10 in the photovoltaic module are switched on or off one by one in response to the start instruction or the shutdown instruction by the following steps A1 or A2.

In step A1, the solar cell strings 10 in the photovoltaic module are switched on one by one in response to the start instruction.

In step A2, the solar cell strings 10 in the photovoltaic module are switched off one by one when the start instruction is not received throughout a first preset time period Further, in a preferred embodiment, a shutdown method for a system is provided. That is, a long-term continuous start instruction is received by the system during operation, and it is determined to shut down the system when the start instruction is not received throughout a time period (i.e., the first preset time period). The preferred embodiment further improves the generality of the technical solutions according to the present disclosure, so that the solutions can be adapted to more types of systems.

Figure 20:
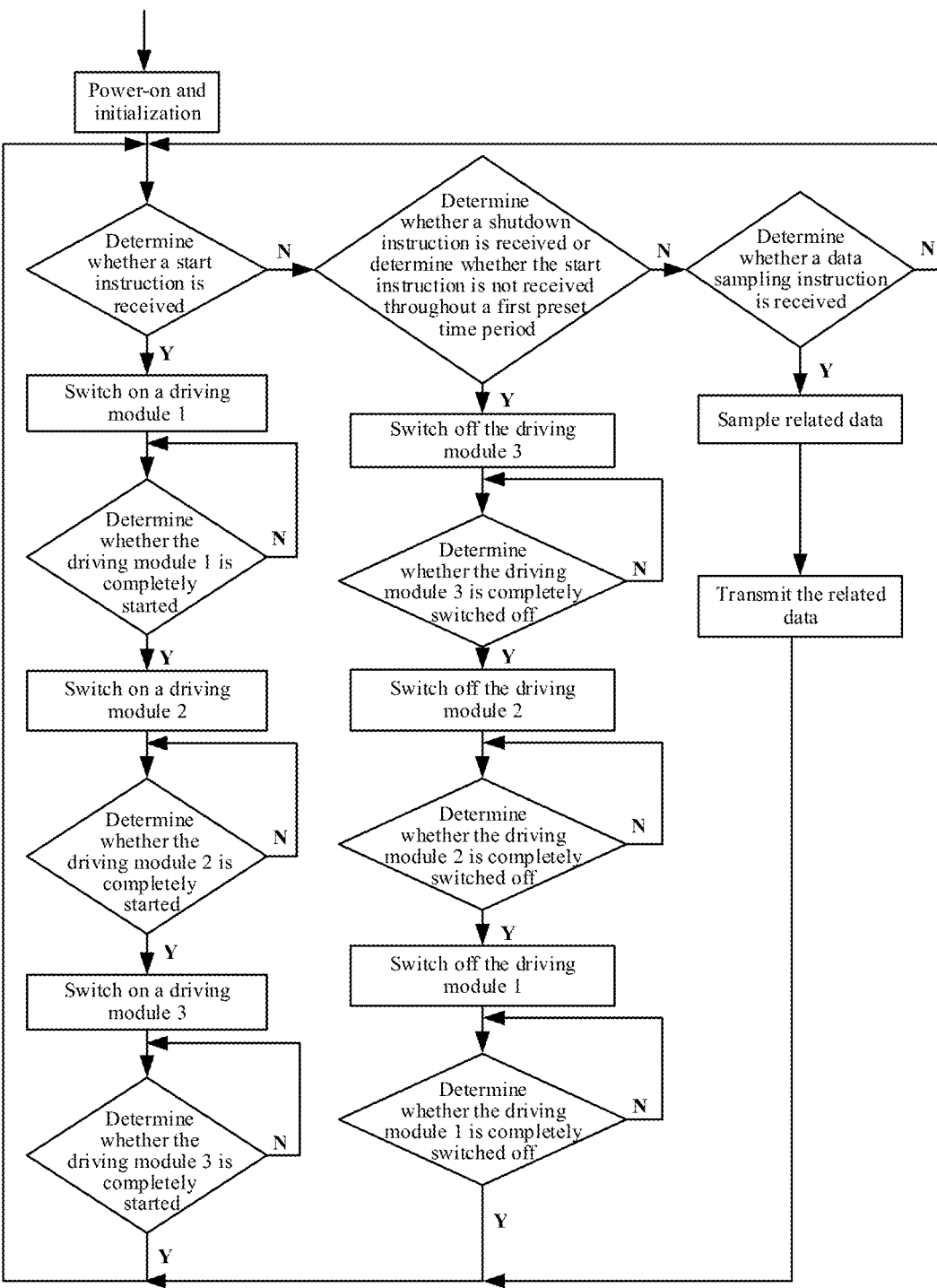
FIG. 20 is a flowchart showing a process of controlling a photovoltaic module according to an embodiment of the present disclosure.

FIG. 20 is a flowchart showing a process of controlling a photovoltaic module according to the present disclosure, which can be understood in conjunction with the embodiments of the method for switching a photovoltaic module. The process of switching on or off the solar cell strings 10 in the photovoltaic module one by one described above is illustrated in the FIG. 20. In an exemplary embodiment, an order in which the driving module 1, the driving module 2 and the driving module 3 are switched on or off is shown in FIG. 20, which may be modified in practice according to actual situations. FIG. 20 further shows execution of a data sampling instruction, which can be understood in conjunction with the foregoing description of the sampling circuit and is not repeated here.

The embodiments in this specification are described in a progressive manner. Each of the embodiments is mainly focused on describing its differences from other embodiments, and references may be made among these embodiments with respect to the same or similar parts. Since the device disclosed in the embodiments corresponds to the method disclosed in the embodiments, the description for the device is simple, and reference may be made to the method in the embodiments for the relevant parts.

It should be noted that relationship terms such as first, second and the like are only used herein to distinguish one entity or operation from another, instead of necessitating or implying such actual relationship or order between entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, a process, method, article or device limited by "comprising/including a (n) . . . " does not exclude existence of another identical element in such process, method, article or device.

The photovoltaic module and the method for switching the photovoltaic module according to the present disclosure are described in detail above. The principle and implementation of the present disclosure are illustrated by using specific embodiments herein. The above descriptions of the embodiments are only used to facilitate understanding of the method and the core idea of the present disclosure. It should be noted that, for those skilled in the art, various modifications and improvements may be made to the present disclosure without departing from the principle of the present disclosure, and these modifications and improvements fall into the protection scope of the present disclosure.

The invention claimed is:

1. A photovoltaic module, comprising:
   an execution junction box;

one master junction box; and a plurality of solar cell strings that are connected in series, wherein the execution junction box comprises a bypass diode, the master junction box comprises a bypass diode and a control module, and the control module is arranged only in the master junction box;

one of the plurality of solar cell strings is connected to another in series through the bypass diode in the execution junction box or the bypass diode in the master junction box; and the control module is configured to control the plurality of solar cell strings to be connected to or disconnected from a main power circuit, the master junction box further comprises a main switching device for directly controlling the entire photovoltaic module to be connected to or disconnected from the main power circuit; and the photovoltaic module is connected in series with the main power circuit through the main switching device.

2. The photovoltaic module according to claim 1, wherein the master junction box comprises a sub switching device, and the execution junction box comprises a sub switching device; and the control module is signally connected to the sub switching devices, and is configured to switch on or off the sub switching devices to control the solar cell string corresponding to the sub switching device to be connected to or disconnected from the main power circuit.

3. The photovoltaic module according to claim 2, wherein two power terminals of the control module are connected to a head end and a tail end of the photovoltaic module, respectively.

4. The photovoltaic module according to claim 3, wherein in a case that the photovoltaic module comprises a main switching device, the main switching device is implemented by an MOS transistor; and in a case that the photovoltaic module comprises the sub switching devices, each of the sub switching devices is implemented by an MOS transistor.

5. The photovoltaic module according to claim 2, wherein two power terminals of the control module are connected to two terminals of one of plurality of solar cell strings, respectively.

6. The photovoltaic module according to claim 5, wherein in a case that the photovoltaic module comprises a main switching device, the main switching device is implemented by an MOS transistor; and in a case that the photovoltaic module comprises the sub switching devices, each of the sub switching devices is implemented by an MOS transistor.

7. The photovoltaic module according to claim 2, wherein in a case that the photovoltaic module comprises a main switching device, the main switching device is implemented by a metal oxide semiconductor (MOS) transistor; and in a case that the photovoltaic module comprises the sub switching devices, each of the sub switching devices is implemented by an MOS transistor.

8. The photovoltaic module according to claim 1, wherein two power terminals of the control module are connected to a positive terminal of one of the plurality of solar cell strings and a negative terminal of one of the plurality of solar cell strings in the photovoltaic module, respectively.

9. The photovoltaic module according to claim 8, wherein in a case that the photovoltaic module comprises the main switching device, the main switching device is implemented by an MOS transistor; and in a case that the photovoltaic module comprises sub switching devices, each of the sub switching devices is implemented by an MOS transistor.

10. The photovoltaic module according to claim 1, wherein the control module comprises a sampling circuit, wherein the sampling circuit is configured to sample electrical signal data at a preset position of the main power circuit or the photovoltaic module.

11. A method for switching a photovoltaic module, applied to the photovoltaic module according to claim 2, comprising:

receiving a start instruction or a shutdown instruction; and switching on or off the solar cell strings in the photovoltaic module one by one in response to the start instruction or the shutdown instruction, wherein, the solar cell strings are switched on or off one by one according to a preset order, and a next solar cell string is switched on or off on receipt of feedback information indicating that a previous solar cell string is completely switched on or completely switched off.

12. The method for switching on or off a photovoltaic module according to claim 11, wherein the switching on or off the solar cell strings in the photovoltaic module one by one in response to the start instruction or the shutdown instruction comprises:

switching on the solar cell strings in the photovoltaic module one by one in response to the start instruction; or switching off the solar cell strings in the photovoltaic module one by one when the start instruction is not received throughout a first preset time period.

13. The photovoltaic module according to claim 1, wherein in a case that the photovoltaic module comprises the main switching device, the main switching device is implemented by an MOS transistor; and in a case that the photovoltaic module comprises sub switching devices, each of the sub switching devices is implemented by an MOS transistor.

* * * * *